United States Patent [19]

Sanaka

[11] Patent Number: 4,531,261
[45] Date of Patent: Jul. 30, 1985

[54] APPARATUS FOR SCRAPING OFF HEADS OF FISH AND CRUSTACEA

[75] Inventor: Hideaki Sanaka, Amagasaki, Japan

[73] Assignee: Daieigiken Inc., Amagasaki, Japan

[21] Appl. No.: 768,898

[22] Filed: Feb. 15, 1977

[30] Foreign Application Priority Data

Feb. 16, 1976 [JP] Japan .................................. 51-16417
Feb. 16, 1976 [JP] Japan .................................. 51-16418

[51] Int. Cl.$^3$ .............................................. A22C 29/02
[52] U.S. Cl. ............................................ 17/71; 17/63
[58] Field of Search ........................... 17/71, 73, 63, 62

[56] References Cited

U.S. PATENT DOCUMENTS

| | | | |
|---|---|---|---|
| 1,677,579 | 7/1928 | Barry | 17/73 |
| 2,507,810 | 5/1950 | Oates | 17/63 |
| 2,529,800 | 11/1950 | Erickson | 17/63 |
| 2,835,918 | 5/1958 | Schlichting | 17/63 |
| 3,247,542 | 4/1966 | Jonsson | 17/73 |
| 3,423,788 | 1/1969 | Lapeyre | 17/71 |
| 3,670,363 | 6/1972 | Hogan | 17/63 |
| 3,691,591 | 9/1972 | Muller | 17/73 |
| 3,789,460 | 2/1974 | Ingalls | 17/73 |
| 3,897,610 | 8/1975 | Lapeyrie | 17/71 |

Primary Examiner—Paul J. Hirsch
Attorney, Agent, or Firm—Gabriel P. Katona

[57] ABSTRACT

Apparatus for scraping off heads of fish and crusts of crustacea, wherein the portions to be scraped off are delivered parallel by means of a feeding device, and then the portions are hitched by a scraping-off pawl plate, the body portions of the fish and crustacea being fixedly pushed against the feeding device. The pawl plate moves in a direction orthogonal to the feeding direction, the portions to be scraped off being removed automatically while the reverse sides of these portions are supported upon the hitching operation by means of a member that moves in the scraping-off direction.

5 Claims, 9 Drawing Figures

FIG. 2

APPARATUS FOR SCRAPING OFF HEADS OF FISH AND CRUSTACEA

The invention relates to an apparatus for scraping off heads of fish and crusts of crustacea.

When fish and crustacea, e.g. lobsters, are refrigerated and preserved, or processed as foodstuffs, the crust on the cephalothorax of the lobster has to be removed from the abdominal region thereof to prevent decay and spoilage before cooking. Conventionally, skilled workers pick up the lobsters one by one; then they skillfully pull off the cephalothorax of each lobster from the abdominal region. This is done by hand, and of course similar procedures apply to fish where head portions similarly have to be removed.

In some cases an apparatus was employed to vertically cut off the boundary between the cephalothorax and the abdominal region (or between the head and the latter) by the use of cutting edges. The lobsters where then delivered successively by means of a conveyer, with the cephalothorax projecting laterally from the edges of the conveyer.

The former case seriously deteriorated the removing efficiency. Also, in the latter case, the vertical cutting-off operation at the boundary line between the cephalothorax and the abdominal region may also cut and remove some meat that is inside the cephalothorax, resulting in a considerable amount of waste.

The present invention has as its object to eliminate the above-described disadvantages. When the worker inserted his finger under the crust of the cephalothorax, he scraped off the crust from the abdominal region. Thus, the cephalothorax could be removed with all the meat inside remaining attached to the abdominal region. Accordingly, the present invention has as one of its objects to provide an apparatus capable of converting the manual operations into mechanical means, and also of performing these operations continuously.

Accordingly, the invention relates to an apparatus designed to mechanically scrape off the crust from the abdominal region as in the pulling off during the manual operation. In this case, the boundary line between the cephalothorax and the abdominal region is not cut off when removing the cephalothorax of fish, and particularly the lobster from the body thereof.

In its major aspects, the apparatus comprises a feeding device for supplying fish and crustacea, such as lobster, the portions to be scraped off, such as the heads, etc., kept parallel and exposed sideways; there are means for scraping off these portions which are placed on the feeding device, in a direction orthogonal to the feeding direction. There is a pushing device for pressing the body portions of the fish that are placed against the feeding device, at least within the action range of the scraping-off means; the latter is provided with a pawl plate for scraping off the portions and a body for supporting the portions, which latter moves in a scraping-off direction, receiving opposite sides of the portions, to be scraped off by the pawl plate.

According to the apparatus of the present invention, simply by mechanically feeding the fish and lobster, which are arranged parallel and in a given direction onto the feeding device, the portions can be scraped off automatically and positively through the cooperative scraping-off action between the pawl plate and the support body, as well as the push fixing action against the abdominal portions of the fish.

Then the fish whose portions are removed can be efficiently delivered to the following stages. Particularly, when the apparatus of the present invention is employed in removing the cephalothorax of lobsters, the crust thereon can be scraped off, with the lump of meat inside the crust remaining on the body side, as in the manual operation. Accordingly, the application of the inventive apparatus is economical.

According to a preferred embodiment of the invention, the feeding device may have concave channels, each being equally spaced in parallel and adapted to hold the fish or crustacea one by one. The channels are inclined downwardly on the sides where the portions to be scraped off exist. A stop is disposed at the obliquely descending edges to prevent the bodies of the fish from slipping out of the channels. The joint use of the above-described feeding device allows the fish to be set on this device very easily within a given space and location relationship.

Accordingly, an incomplete scraping-off operation can be prevented from occurring, as could be the case due to the positional sliding of the fish or inconveniences of pulling off their body portions.

Furthermore, the pushing force against the fish is weakened to an extent that the fish cannot be damaged. The fish are retained positively in given positions on the feeding device through the operative cooperation of the stop and the pushing device.

Accordingly, an incomplete scraping off is again prevented that might furthermore occur due to sliding of the fish along the scraping-off direction or any inconvenience for the fish to be left out from the feeding device.

According to an optional feature of preferred embodiment of the invention, the scraping-off means is so constructed that the route traversed by the pawl plate and the scraping-off portion supporting route by the support body may partially overlap. A driving means is provided to drive the support body and the scraping-off pawl plate through an operative cooperation so that the support body may move first and is then followed by the pawl plate.

In order to employ the present invention as described hereinabove, the cephalothorax crusts of lobsters can be hitched and separated from the body portions by means of the pawl plate while the abdominal sides are being bent, as in the pulling off the cephalothorax crust with manual operations. When the lobster is set on the feeding device with the back of the cephalothorax crust being placed towards the support body, and the abdominal portion towards the pawl plate, the preceding support body supports the back, and the front end of the pawl plate which follows the support body engages the abdominal side base of the crust.

When the crust has been pulled off, being grasped between the support body and the pawl plate, the front end of the plate gradually presses the base of the crust against the back of the lobster at a position behind the terminal of the preceding support body. The cephalothorax crust is pulled while the abdominal side is being bent so that the abdominal side base portion (the portion engaged with the scraping-off pawl portion) may constitute a holding point. Accordingly, the crust can be removed skillfully, without damaging the meat as in pulling off the cephalothorax crust by hand. It will be understood by those skilled in the art that these operations, although described with specific reference to lobsters, apply in an identical or very similar manner to fish where the heads have to be scraped off without damaging the meat.

Further important characteristics of the preferred exemplary embodiment of the present invention are that the feeding device carries the fish continuously, and the pushing device and the scraping-off means effect a combined operation while the fish is moved parallel and aligned with the direction of the feeding device.

The above-described construction allows the scraping-off operation to be effected while the feeding device is continuously operated, as compared with the case where this device is stopped intermittently and the portions of the fish and crustacea are scraped off during the inoperative periods. Therefore, greater handling capabilities, drastically improved efficiency, and higher economical cost effectiveness per time unit are achieved.

The invention will be better understood, together with its important features, objects and advantages, with reference to the description that follows, with regard to the accompanying drawings, wherein FIG. 1 is a front elevation of an exemplary apparatus according to the present invention;

FIG. 2 is a top plan view thereof;

Figure 8A:
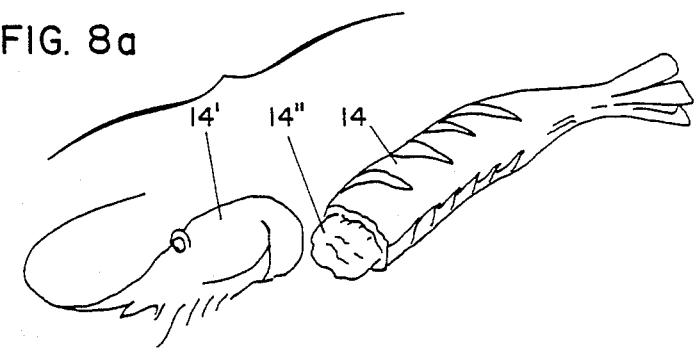
FIGS. 8a, 8b are perspective views how the crusts and scales, respectively, are scraped off the thorax of fish, and the cephalothorax of crustacea, e.g. a lobster, respectively.
Figure 8B:
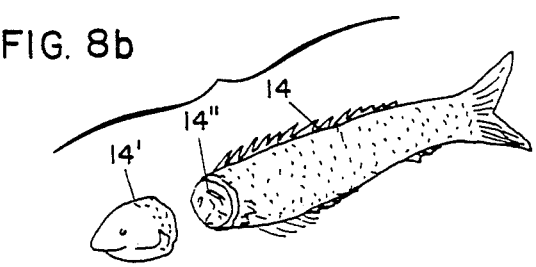

Reference should first be made to FIGS. 8a and 8b which illustrate a lobster and a fish, both being generally designated by numeral 14, having portions 14' to be removed or scraped off, and useful meat portions 14", inside the body, which are to be saved without removal, as will be explained in the course of the description that follows.

Figure 1:
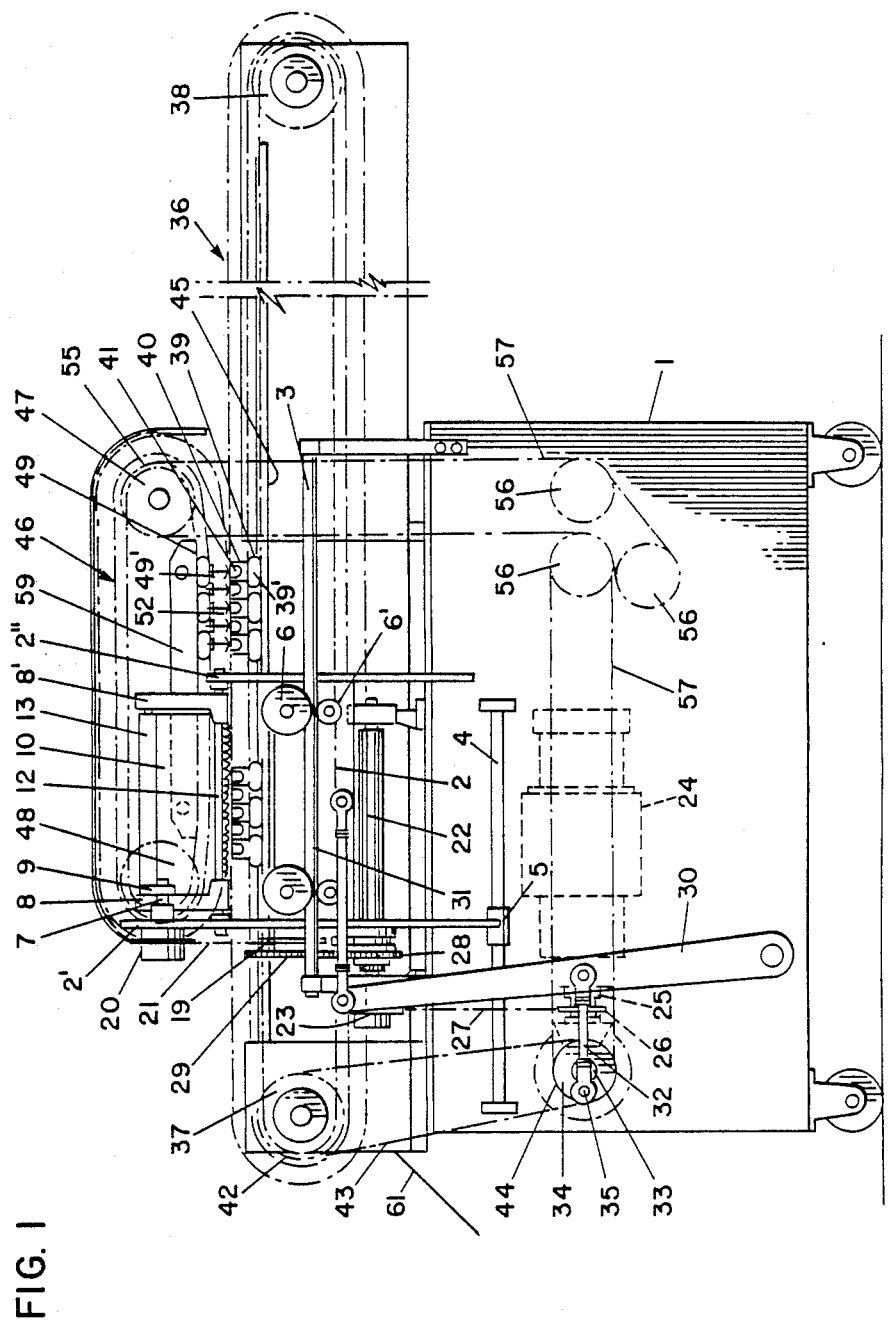
Figure 2:
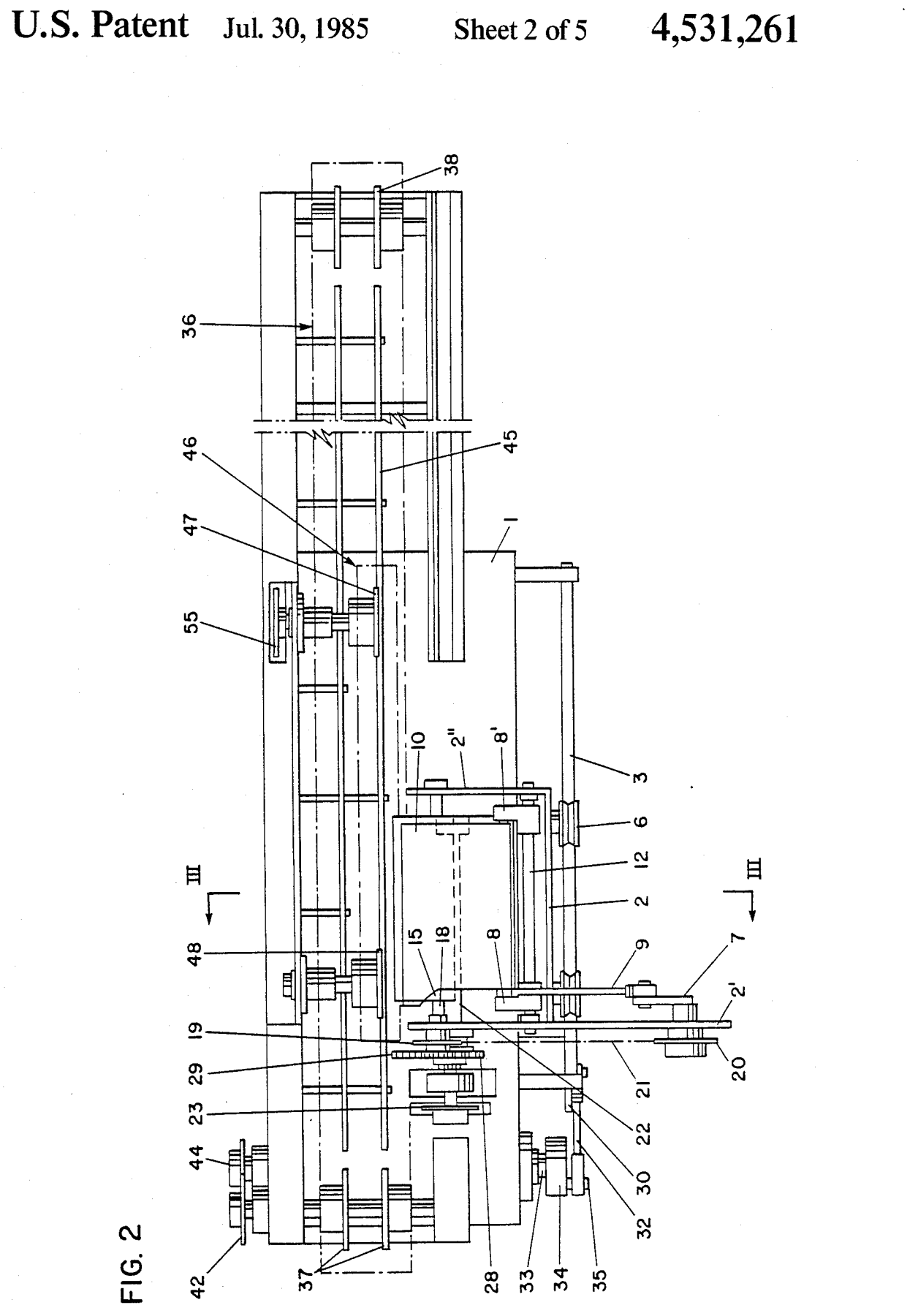
Figure 3:
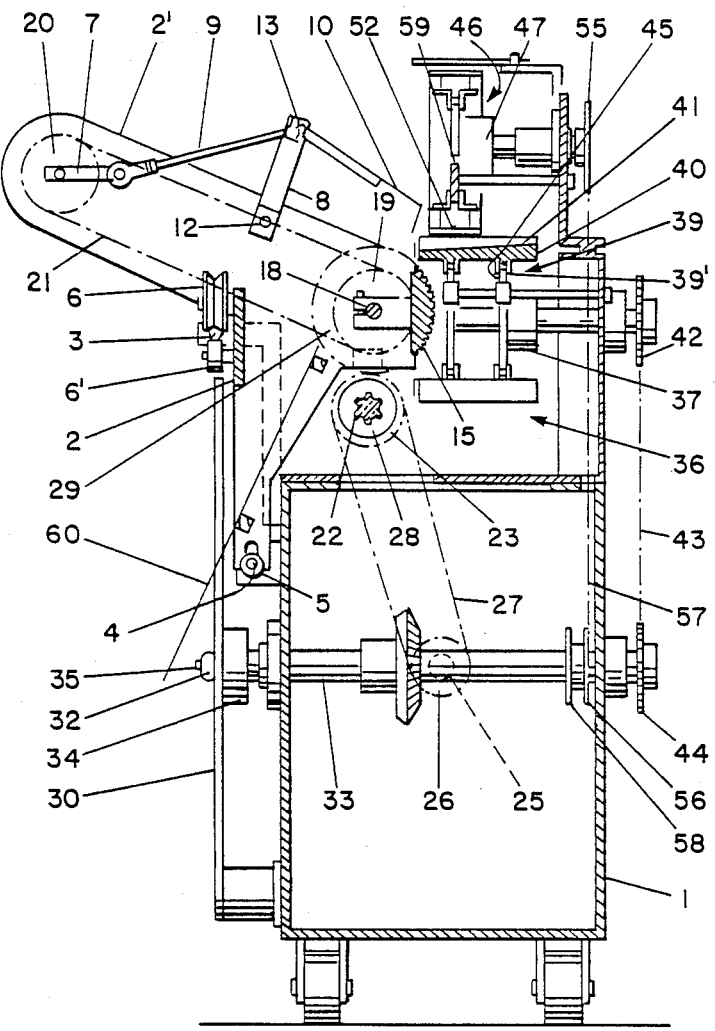
FIG. 3 is a cross-sectional view taken along the line III—III of FIG. 2.

A preferred, exemplary embodiment of the present invention will now be described with reference to the drawings. Referring mainly to FIGS. 1 and 2, and particularly to the former, numeral 1 denotes a base for the apparatus; 2 is a travelling frame that is movably installed horizontally with respect to the base 1 through a guide rail 3 and a guide rod 4 that are horizontally disposed respectively in upper and lower positions on the side of the base 1. The frame 2 is provided at both ends, right and left, with opposing side plates 2', 2". The former is slidably connected at its lower end to the guide rod 4 through a slider 5.

The guide rail 3 is grasped between a number of pairs of rollers 6, 6', upper and lower, disposed on the front face of the travelling frame 2. Thus, the latter is supported by the guide rail 3 and the guide rod 4, and is movable along these parts horizontally with respect to the base 1.

A crank arm 7 and a swinging arm 8 spaced from each other and pivot on the side plate 2' of the frame 2. A bell-crank lever 9, bent upwardly in a convex shape, pivots at its lower end on the arm 7, and pivots at its joint on the upper end of the arm 8 which oscillates following the movement of the lever 9. A scraping-off pawl plate 10, fixedly mounted on the front end portion of the lever 9, is adapted to move along an approximately elliptical path or route 11 (see FIG. 4), including a path 11' that moves to a downwardly oblique forward portion through a composite motion of the bell-crank lever 9, produced by a two-point pivoting between the arms 7 and 8.

The plate 10 is wide and fixedly supported by means of a bar 13 movably disposed between respective upper end portions of the swinging arms 8, 8' (see FIG. 2). The latter is mounted opposite to the arm 8 and is capable of performing the same motions as the other arm, being pivotally mounted on the side plate 2" with a pivotal shaft 12 which is similarly disposed in the arms 8, 8'. The approximately elliptical movement 11 is similar to the path described by the hand of a skilled worker when skillfully scraping off the thorax or cephalothorax of fish and of crustacea, respectively, in the workshop. The movement is of course similar if fish are processed rather than, for example, lobsters.

Figure 4:
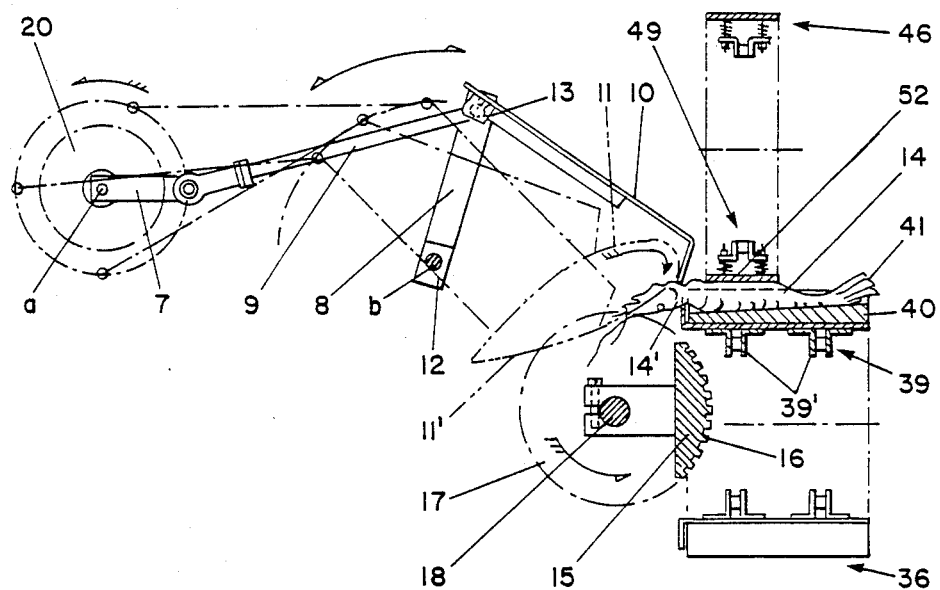
FIG. 4 is a longitudinal, sectional side view showing essential, enlarged parts of FIG. 3.

In the approximately elliptical movement, it is particularly essential to maintain the path 11' that describes the downwardly oblique forward motion. In FIG. 4, an arrow shows how the path 11 continues in the forward motion 11'. It is apparent from the hand movements during manual operation, and the results of experiments, that the exposure of the portions 14' to be scraping off during the motion ensures a positive scraping-off operation.

The path of the lever 9 will now be described more fully with reference to FIG. 4. The crank arm 7 turns around a point a, and the swinging arm 8 oscillates about a point b, describing circular arcs. Accordingly, the respective front ends of the arms 7, 8 perform only circular arc motions. On the other hand, the pawl plate 10, secured to the extended end of the lever 9, which latter constitutes a coupling lever that connects the arms 7 and 8, performs complex curvilinear motions. Consequently the relative lengths of the arms 7, 8, and the extended length of the bell-crank lever 9 have to be determined. As a matter of example, the Lungen method allows the pawl plate 10 to describe a path which is most approximate to the hand movements during the manual operation in respect of the required curvilinear motions.

Coming now to FIGS. 2 to 5, a support body 15 is placed downwardly of the plate 10, and rotates in a direction opposite to the eliptical moving direction of the plate, but moves in the same direction along a mutually adjacent path, opposite to the pawl plate 10. The support body 15 is pivotally mounted on a shaft 18 between the side plates 2', 2" of the frame 2. The body 15, which forms a portion of a cylindrical shape, is approximately semicircular in section, and is provided with anti-skid projections 16 (FIG. 4) on its outer peripheral face. The member 15 rotates in describing a circular path or locus 17 about the shaft 18.

The scraping-off part supporting route portion of the circular path 17 and the scraping-off operating route portion (path 11') of the scraping-off pawl plate 10 overlap as can be seen in FIG. 4. The support body 15 rotates first, being followed by the pawl plate 10, thus avoiding collision between the support member and the pawl plate.

One end of the shaft 13 is extended outside through the side plate 2' to provide thereon a chain sprocket 19. A gearing chain 21 is entrained between the sprocket 19 and a chain sprocket 20 for driving the crank arm 7 so that the scraping-off pawl plate 10 operatively cooperates with the support body 15, as described hereinabove. A spline shaft 22 is rotatably disposed in the apparatus base 1, being provided downwardly of the shaft 18 and parallel therewith. The shaft 22 is driven by means of a motor 24, a gearing chain 27 being entrained between a chain sprocket 23 mounted on one end of the shaft 22 and a chain sprocket 26 mounted on a driving shaft 25 rotated by the motor, placed within the base 1.

A gear 28 is engaged with the spline shaft 22, being inter-lockingly rotated and slidable in the axial direction. The gear 28 moves together with the frame 2 and is normally in engagement with a gear 29 mounted on the front end of the shaft 18. The motor 24 rotates the shaft 22 through the shaft 25, the sprocket 26, the chain 27 and the sprocket 23. Furthermore, the turning effort rotates the shaft 18 through the gears 28, 29 so as to cause the crank arm 7 of the plate 10 to cooperate with the support body 15. Rotation is imparted to the shaft 18 from the motor 24 intermittently through the spline shaft 22 if the travelling frame 2 moves.

Numeral 30 is a crank for repeatedly reciprocating the frame 2 at a given speed and at a given distance. The crank pivots, in its lower end, on the base 1. One end of the crank 30 is coupled to the frame 2 through a link 31. One end of the link 32 pivots at a point close to the lower end of the crank 30, and the other end thereof pivots on an eccentric shaft 35 of a disc 34 which latter is mounted on one end of a driven shaft 33 that interlocks with the driving shaft 25. Upon rotation of the disc 34 through the rotation of the shaft 33, the link 32 reciprocates through the cranking operation of the eccentric shaft 35, reciprocatingly to oscillate the crank 30. As a result, the travelling frame 2 reciprocates, as will be described later, along the rail 3 and the rod 4.

A feeding device 36 for the fish and crustacea is disposed on the base 1, drivingly to effect a continuous feeding operation in a direction orthogonal to the moving path 11 of the pawl plate 10. The device 36 has two endless chains 39 entrained between a driving sprocket 37 and a driven sprocket 38 which are disposed in the front and the rear, respectively, as a pair. The conveyer-shaped feed drive has support members 40 secured between pairs of opposite chain links 39' in the endless chains 39.

The feeding device 36 is adapted to carry the fish and crustacea 14 successively, accommodating each in a concave channel 41, provided in the longitudinal surface direction of each support member 40. The device 36 has a chain sprocket 42 interlocked, through a gearing chain 43, with a chain sprocket 44 on the shaft 33, the sprocket 42 being provided coaxially on the sprocket 37. Numeral 45 denotes a guide lever which is supported on the base 1, this lever being provided to cause the upper side of the chain 39 to be normally tensioned to stably move the support members 40 in the horizontal direction.

The device 36 and the frame 2 are driven in operative cooperation through the shaft 33. Upon rotation of this shaft by the motor 24, the device 36 is driven at a given speed through the sprocket 44, the chain 43 and the sprocket 42. At the same time, the frame 2 is reciprocated, through the disc 34, the shaft 35, the link 32, the crank 30 and the link 31, at a speed equal to the feeding speed along the device 36, as described hereinabove. The reciprocating-motion width of the travelling frame 2 is made one-half of the width of the scraping-off pawl plate 10 mounted in the frame 2.

Accordingly, when the frame is reciprocated at a speed equal to that of the feeding device 36, the moving distance of the latter device during the forward operation becomes identical with the width of the scraping-off pawl plate 10. Thus, a plurality of the support members 40 that correspond to the width are sequentially confronted as an integrated unit with the scraping-off plate 10.

During the return operation, the pawl plate 10 travels at a speed equal to that of the device 36, describing the path 11' and moving to a downwardly oblique forward part in the approximately elliptical route 11, so that the head portions 14' of the fish or crustacea 14 that are placed on the support members 40 are scraped off integrally in one sweep. Accordingly, when the reciprocating motion of the frame 2 is repeated, the crustacea or fish that are continuously fed by the device 36 are sequentially scraped off continuously by the entire width of the scraping-off pawl plate 10 (see FIG. 4).

A pushing device 46 is provided for holding the fish or crustacea, so that their portions to be scraped off may be exposed in the course of the path 11', which turns to a downwardly oblique forward portion in the moving path 11 of the pawl plate 10. The device 46, which is a narrow conveyer, has an endless chain 49 entrained between a driving sprocket 47 and a driven sprocket 48. The pushing device approaches the feeding device 36 and has the same direction as that of its opposite portion. The pushing device is located in a position opposite to the moving route of the travelling frame 2, as can be seen in FIG. 2.

Figure 6:
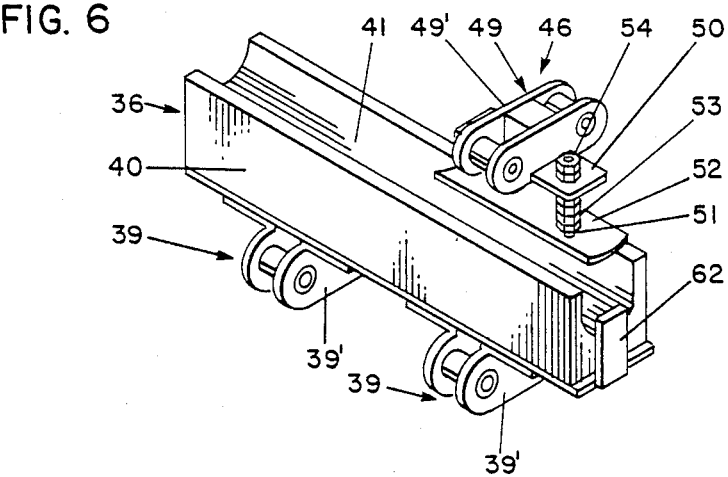
FIG. 6 is a perspective view of some of the essential parts, showing the relationship between a pushing device and a feeding device.
Figure 7:
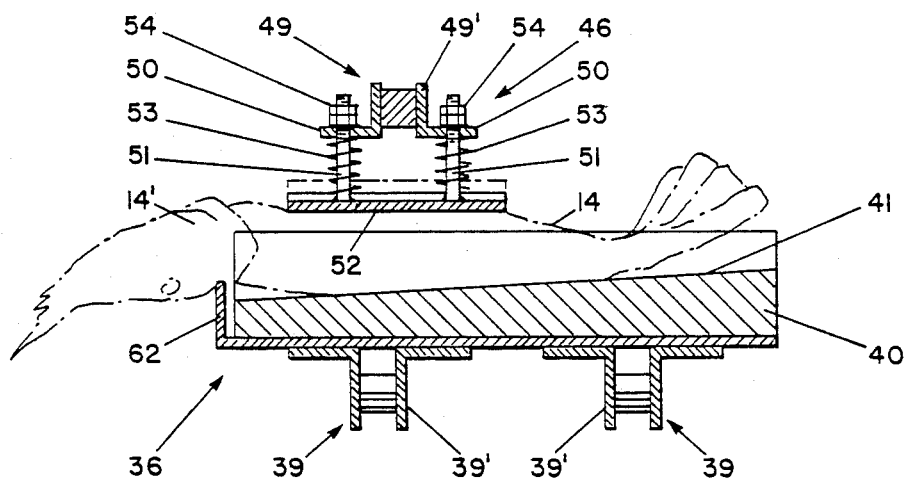
FIG. 7 is a longitudinal, sectional, enlarged side view of FIG. 6.
Figure 5:
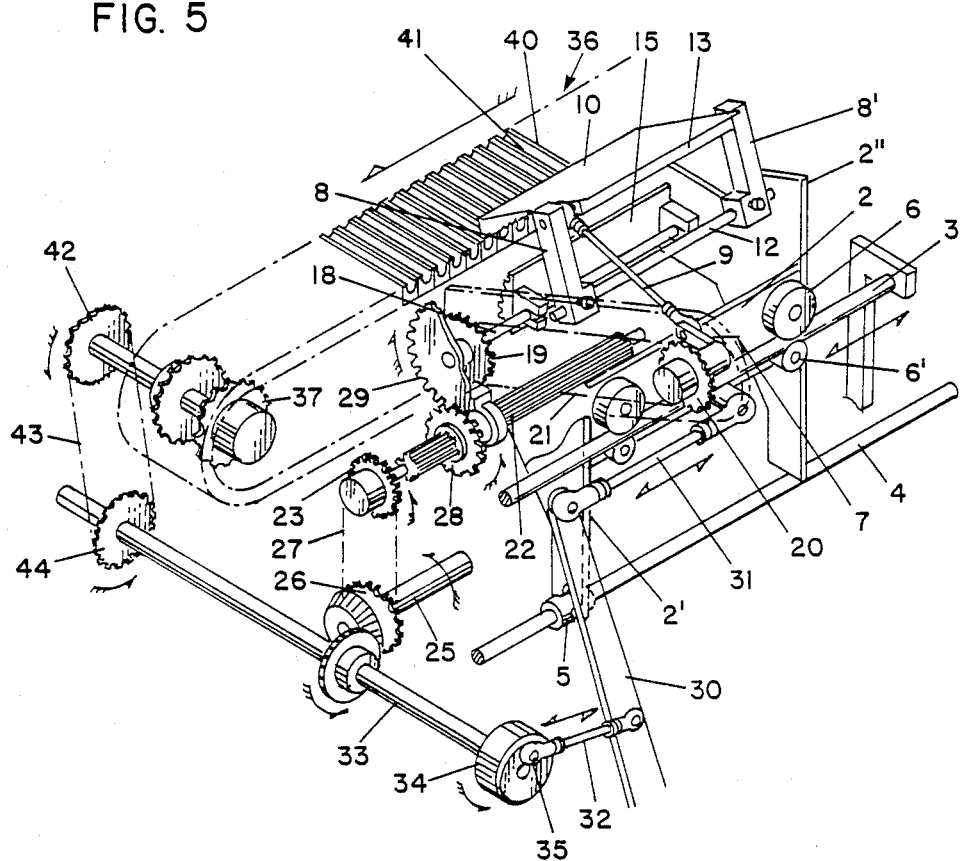
FIG. 5 is a perspective view showing the essential parts of the apparatus of the present invention.

As shown in FIGS. 6 and 7, projections 50 are horizontally provided respectively in a longitudinal direction from the lower end of each chain link 49' (FIG. 1) of the chain 49. A bolt 51 is loosely engaged vertically in each piece 50. A push plate 52, engaged in each channel 41 of the member 40 in the feeding device 36, is secured between the front ends of the bolts 51. A coil spring 53 is loosely engaged around each bolt 51 and between the push plates 52 and the projections 50. Lock nuts 54 for space adjustment are screwed on the bolts 51. The push plate 52 is confronted with the concave channel 41 of each support member 40 in the device 36, and the fish or crustacea 14 are adapted to be held resiliently through the action of the springs 55, the fish being accommodated in the channels so that the portions to be scraped off are exposed above the edges of the channels 41.

The pushing device 46 is made longer than the width of the scraping-off pawl plate 10. A chain sprocket 55 (FIG. 1), mounted coaxially on the sprocket 47, is operatively connected with a chain sprocket 58 on the shaft 33 through a number of chain sprockets 56, a gearing chain 57, so that the sprocket 55 is rotated at a speed equal to that of the feeding device 36. Numeral 59 denotes a guide plate which acts to normally press the lower side of the chain 49, to cause the plates 52 to approach the support member 40. The guide plate 59 is supported on the base 1. Numerals 60, 61 will be explained somewhat later.

The concave channels 41 of the support members 40 are inclined downwardly, towards the pawl plate 10, as shown in FIG. 7. A stop 62 (FIGS. 6, 7) is provided, projecting upwardly from the edge on the descending side so as to control the positions of the fish 14 when inserted in the channels 41.

In order to use the inventive apparatus, the adjusting lock nuts 54 of the pushing device 46 are operated to adjust the spacing between the push plates 52 and the projections 50, as shown in FIG. 7 in dot-dash lines, to fit the sizes of the fish or lobster 14 that are to be retained and carried. Then, the fish and the like 14 are sequentially accommodated in the respective tapering channels 41 in each support member 40, while the feeding device 36 is being rotated, whereupon the boundary portions between the portions to be scraped off, such as the cephalothorax, and the abdominal portion, are located on the steps 62.

Since the channels are inclined downwardly towards the stops 62, the fish 14 are necessarily fixed in given positions of the channels through the existence of the slopes and the stops even if they are accommodated or inserted in a disorderly manner. The fish or lobsters 14 which are thus accommodated in the support members 40 of the feeding device 36 are fed continuously in an equally spaced order. When the fish reach a point just before the scraping-off pawl plate 10 of the reciprocating frame 2, the push plates 52 in the device 46 sequentially hold the fish resiliently in the channels 41 through the action of the coil springs 53.

At the same time, the pawl plate 10, which moves along the approximately elliptical path 11 through the action of the bell-crank lever 9, moves to the path 11', travelling the downwardly oblique forward portion, in accordance with the double action of the travelling frame 2. The plate 10 hitches the portions 14' to be scraped off, as explained before, and scrapes them away at once, the removed portions being pushed by the plates 52 and exposed, projecting from the edges of the support members 40 in the feeding device 36.

The support body 15, which rotates before the scraping-off operation is effected, supports the portions 14']from below, and projects from the support members 40. When the portions to be scraped off have come to be supported on the end of the body 15, the pawl plate 10 engages the bases of the portions 14' to pull them, being grasped between the pawl plate 10 and the support body 15. Accordingly, the portions 14' are pulled off. At this time, the front end of the pawl plate 10 moves obliquely and downwardly from the initial engaging position with respect to the bases of the portions 14'.

The front end of the pawl plate 10 is made to follow the support body 15. Thus, they will not collide, and the portions 14' will not be crushed between the plate 10 and the body 15. Also, through the related motion of the plate 10 with the body 15, the portions 14' are being pulled, being somewhat bent or twisted with respect to the remaining body on the support member 40, so that the engaging portion of the portions to be scraped off may constitute a folding point with the pawl plate 10.

The described action is similar to the manual pulling-off operation of the cephalothorax crust, respectively the removal of the head, in crustacea and in fish. When the lobsters are set into the feeding device, with the abdominal portions thereof being placed upwardly as shown, the desired object can be very easily achieved. The portions which have been scraped off through the above-described process are released outside through a chute 60 (see FIG. 3). The fish or crustacea (lobsters) 14, whose portions 14' have been removed, are carried further by means of the feeding device, 36 so that the portions 14' may eventually be collected through another chute (see FIG. 1) from the end of the device 36.

As described above, according to the present invention, the scraping-off pawl plate is adapted to realize and follow a path that is similar to that described by the operating hand of a skilled worker. In the inventive apparatus, this is performed by means of the bell-crank lever through the two-point pivotal mounting crank arm and its swinging arm. Accordingly, efficient repetitious operation is effected. In addition, the meat 14" inside the portions 14' that have been scraped off, such as the body of the fish and the cephalothorax of the crustacea, can be removed without any loss, such meat 14" remaining attached to the abdominal portions, as can be seen in FIGS. 8a and 8b, through the cooperation of the scraping-off pawl plate and the support body.

It will be understood by those skilled in the art that various changes, modifications, additions, etc. can be made in the inventive apparatus, as required, without departing from the spirit and scope of the present invention.

What I claim is:

1. An apparatus for scraping off portions such as the heads (14') of fish and the crusts of crustacea (14), comprising: a feeding device (36) for carrying the fish and crustacea so that the portions to be scraped off remain substantially parallel, being exposed sideways; means for scraping off the portions that are placed on said feeding device, in a direction orthogonal to the feeding direction by said feeding device; a device (46) for pushing abdominal portions of the fish and crustacea against said feeding device, the fish and crustacea being placed on said feeding device, located at least in the operating region of said scraping-off means; the latter being provided with a pawl plate (10) which hitches the portions to be scraped off; a support member (15) for receiving reverse sides of the portions that said pawl plate hitches and moves along a scraping-off direction; means for simultaneously operating said pushing device and said scraping-off means on a plurality of fish and crustacea placed parallel on said feeding device; wherein the latter carries the fish and crustacea continuously; said pushing device and said scraping-off means including means (2 to 6, 6', 22 and 28 to 35) for pushing the travelling fish and crustacea before the scraping-off operation, while the fish and crustacea are moved parallel with and aligned with the feeding direction; and means for reciprocating said scraping-off means, parallel with said feeding device, to effect the scraping-off operation, while moving at an equal speed along the feeding direction, the width of the reciprocating motion being one-half of the operating width of said scraping-off means.

2. The apparatus as defined in claim 1, wherein said pawl plate (10) is rotatable into an approximately elliptical moving path (11) that includes a downwardly oblique scraping-off operating route (11') by means of a driving mechanism (19) including a driven crank arm (7) and at least one swinging arm (8, 8') for regulating the path.

3. The apparatus as defined in claim 1, wherein said scraping-off means is so constructed that an operating route (11) of said pawl plate (10) and a scraping-off portion supporting route (17) of said support member (15) partially overlap, further comprising means (20, 21, 23 to 29) for driving said support member and said pawl plate so that said support member moves first and is followed by said pawl plate.

4. The apparatus as defined in claim 1, further comprising means for rotating said pushing device (46), a push operating route portion moving parallel, opposite to said feeding device, which is included in a circulating rotational route.

5. The apparatus as defined in claim 1, wherein said feeding device (36) has equally spaced, parallel concave channels (41) that accommodate the fish and crustacea (14) one by one, said pushing device (46) being provided with a push plate (52) corresponding to each of said channels, and a spring (53) for biasing said push plate to a limit position on the sides of said channels, and means (54) for changing the limit position.

* * * * *